United States Patent [19]
Fujita et al.

[11] Patent Number: 5,833,262
[45] Date of Patent: Nov. 10, 1998

[54] AIR BAG ASSEMBLY

[75] Inventors: Yoshiyuki Fujita; Koji Sakurai, both of Aichi, Japan

[73] Assignee: Toyoda Gosei Co., Ltd., Aichi, Japan

[21] Appl. No.: 899,564

[22] Filed: Jul. 24, 1997

[30] Foreign Application Priority Data

Jul. 25, 1996 [JP] Japan .................................. 8-196515

[51] Int. Cl.⁶ .................................................. B60R 21/16
[52] U.S. Cl. .................................... 280/728.2; 280/728.3; 280/731
[58] Field of Search ............................... 280/731, 728.3, 280/728.1, 728.2

[56] References Cited

U.S. PATENT DOCUMENTS

| | | | |
|---|---|---|---|
| 5,470,634 | 11/1995 | Persson et al. | 280/728.3 |
| 5,580,082 | 12/1996 | Shiga et al. | 280/728.3 |
| 5,630,612 | 5/1997 | Yamamoto et al. | 280/731 |

FOREIGN PATENT DOCUMENTS 7-96813  4/1995  Japan .

Primary Examiner—Eric D. Culbreth
Attorney, Agent, or Firm—Cushman Darby & Cushman IP Group of Sutro, LLP

[57] ABSTRACT

An air bag assembly mountable in an automobile vehicle, which assembly includes an air bag, a pad, and a bag holder. The air bag is expandable between a folded state and a deployed state. The pad has a ceiling wall structure and a side wall structure. The ceiling wall structure is configured to cover the air bag when in the folded state and constructed and arranged to rupture when the air bag expands from the folded state to the deployed state to create a passageway which permits the air bag to deploy into an interior compartment of the vehicle. The side wall structure of the pad extends from the ceiling wall structure to define a substantially annular cross section and includes a plurality of spaced lock holes formed therein. The bag holder, which holds the air bag and the pad, includes first and second plates which are substantially horizontally and vertically oriented, respectively, when the air bag assembly is mounted in the vehicle. The horizontal plate has a plurality of spaced insertion holes formed therein, which are arranged to receive portions of the side wall structure of the pad. The vertical plate includes a plurality of locking claws, which are disposed to extend radially inward and engage the lock holes of the pad to thereby secure the pad to the bag holder.

3 Claims, 7 Drawing Sheets

AIR BAG ASSEMBLY

BACKGROUND OF THE INVENTION

1. Field of the Invention

The present invention relates to an air bag assembly adapted to be mounted in an automotive vehicle as part of a supplemental restraint system.

2. Description of the Related Art

Air bag assemblies are becoming increasing prevalent in the automobile industry for their use as secondary restraint systems in many, if not most, new automobiles.

Generally, conventional air bag assemblies comprise an air bag expandable upon actuation between a folded state and a deployed state, a pad having a ceiling wall and a side wall with lock holes, and a bag holder interconnecting the air bag and the pad as disclosed in Japanese Patent Publication No. Hei. 7-96813 shown in FIG. 11. The side wall 100 of the pad is positioned radially outward with respect to a side wall 101 of the bag holder 102, which is usually provided with locking claws 103 that engage lock holes 104 in the side wall 101 of the bag holder 102 to secure to pad to the bag holder 102. The locking claws 103 project from an outer surface of the side wall 101 of the bag holder 102 and extend in a radially outward direction, and are locked from the inside. During expansion of the air bag 105 from a folded state to a deployed state, the air bag 105 is actuated via a gas generating system and expands against the backside of the ceiling wall 106 of the pad. The expansion of the air bag 105 causes the pad to rupture and form a passageway permitting the deployment of the air bag 105 into a compartment of the vehicle, which thereby protects the occupants from violent collision. However, the outward pressing force and upward tensile force transferred to the pad by the expansion of the air bag 105 can cause the locking claws 103 to extend outwardly and disengage the lock holes 104 of the pad. As a result, the pad can become disengaged from the bag holder 102 during inflation of the air bag 105.

To prevent such disengagement, it has been proposed to provide a pressing plate 107, which is arranged radially outward with respect to the pad and bag holder 102 and constructed to apply a pressing force against the pad and the bag holder 102 to thereby fix the pad and bag holder 102. However, in order to withstand the above-discussed outward pressing force delivered by the expanding air bag 105, the pressing plate 107 must have a relatively large thickness. Consequently, the weight of the air bag assembly is correspondingly increased.

SUMMARY OF THE INVENTION

It is therefore an object of the present invention to provide an air bag assembly which overcomes the above-discussed problems of conventional assemblies, and which has a reduced weight without sacrificing the strength of the locking connection between the bag holder and the pad.

In accordance with the principles of the present invention, this and other objects are obtained by providing an air bag assembly constructed to be mounted in an automobile vehicle, which assembly includes at least an air bag, a pad, and a bag holder. The air bag is retained in a folded state prior to actuation of the air bag assembly, yet is expandable from the folded state to a deployed state upon actuation of the air bag assembly. The pad has both a ceiling wall structure and a side wall structure. The ceiling wall structure is configured to cover and conceal from view the air bag when in the folded state and constructed and arranged to rupture when the air bag expands from the folded state to the deployed state to create a passageway which permits the air bag to deploy into an interior compartment of the vehicle. The side wall structure of the pad extends from the ceiling wall structure to define a substantially annular cross section and includes a plurality of spaced lock holes formed therein. The bag holder, which holds the air bag and the pad, includes at least first and second plates which are substantially horizontally and vertically oriented, respectively, when the air bag assembly is mounted in the vehicle. The horizontal plate has a plurality of spaced insertion holes formed therein, which are arranged to receive portions of the side wall structure of the pad. The vertical plate is disposed in a radially outward position with respect to the side wall structure of the pad. The vertical plate includes a plurality of locking claws, which are disposed to extend radially inward and engage the lock holes of the pad to thereby secure the pad to the bag holder.

In accordance with the assembly of the present invention, the bag holder and locking claws are constructed and arranged with respect to the pad to restrict the outward movement of the pad and significantly reduce the likelihood of the pad disengaging from the bag holder during inflation of the air bag. As a result, the assembly can optionally exclude a pressure plate, or can employ a pressure plate of a reduced thickness, to thereby advantageously reduce the overall weight of the air bag assembly.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWING

The accompanying drawings illustrate the present invention. In such drawings.

DETAILED DESCRIPTION OF THE INVENTION

An embodiment of the present invention will be described below with reference to the drawings.

Figure 2:
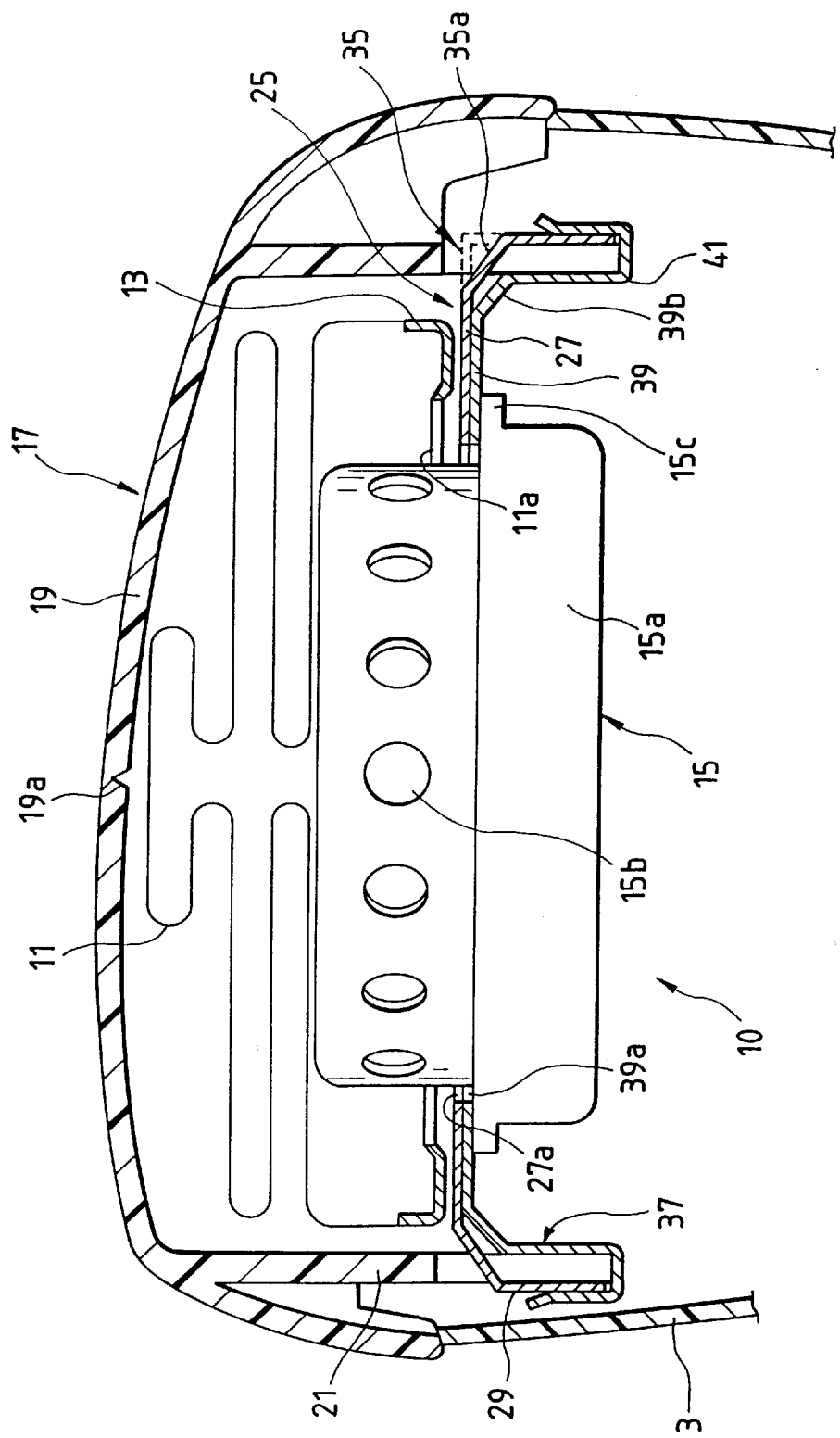
FIG. 2 is a schematic sectional view of the air bag assembly of FIG. 1 taken along sectional line II—II of FIG. 1.
Figure 3:
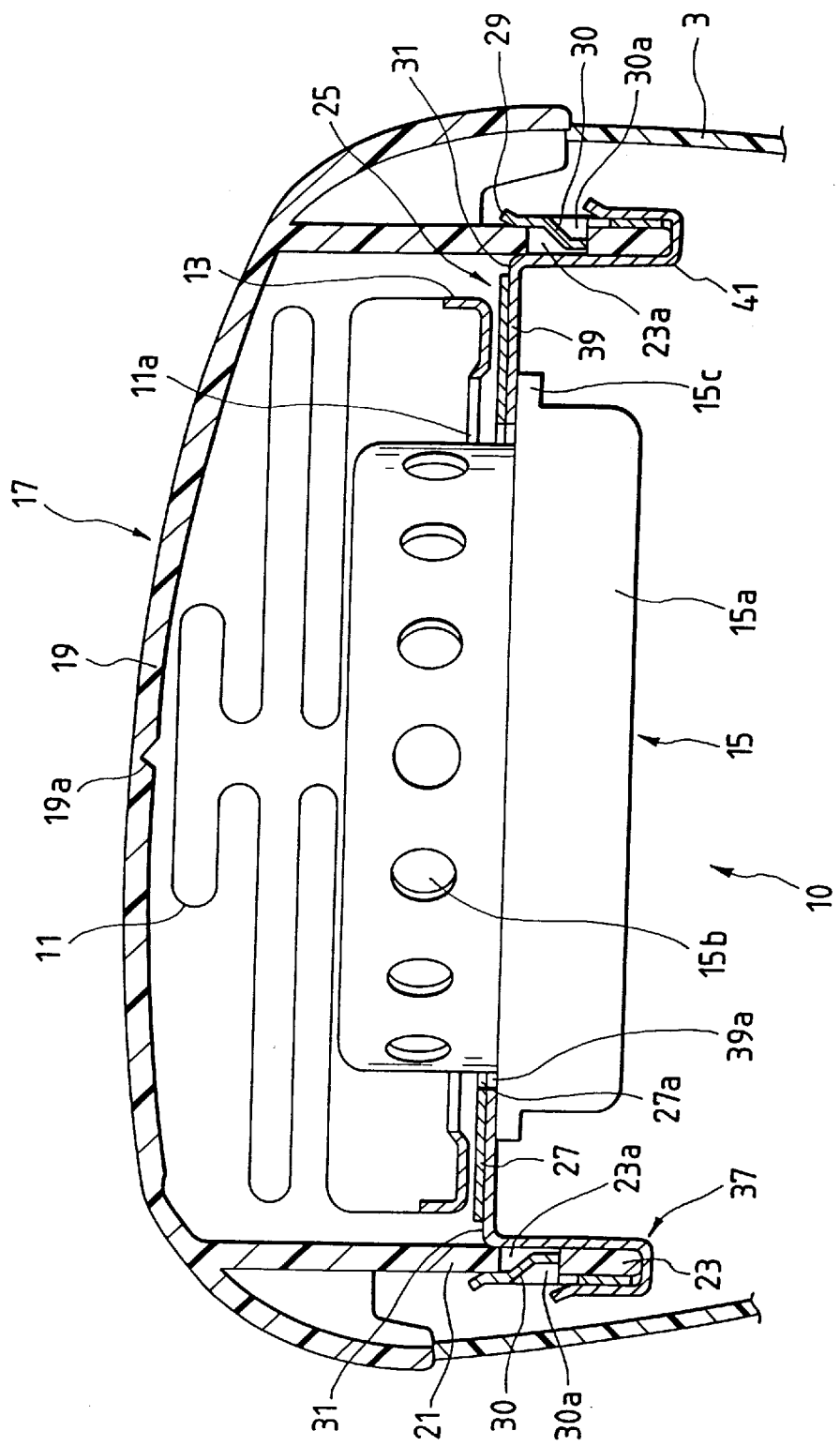
FIG. 3 is another schematic sectional view of the air bag assembly of FIG. 1 taken along sectional line III—III of FIG. 1.
Figure 4:
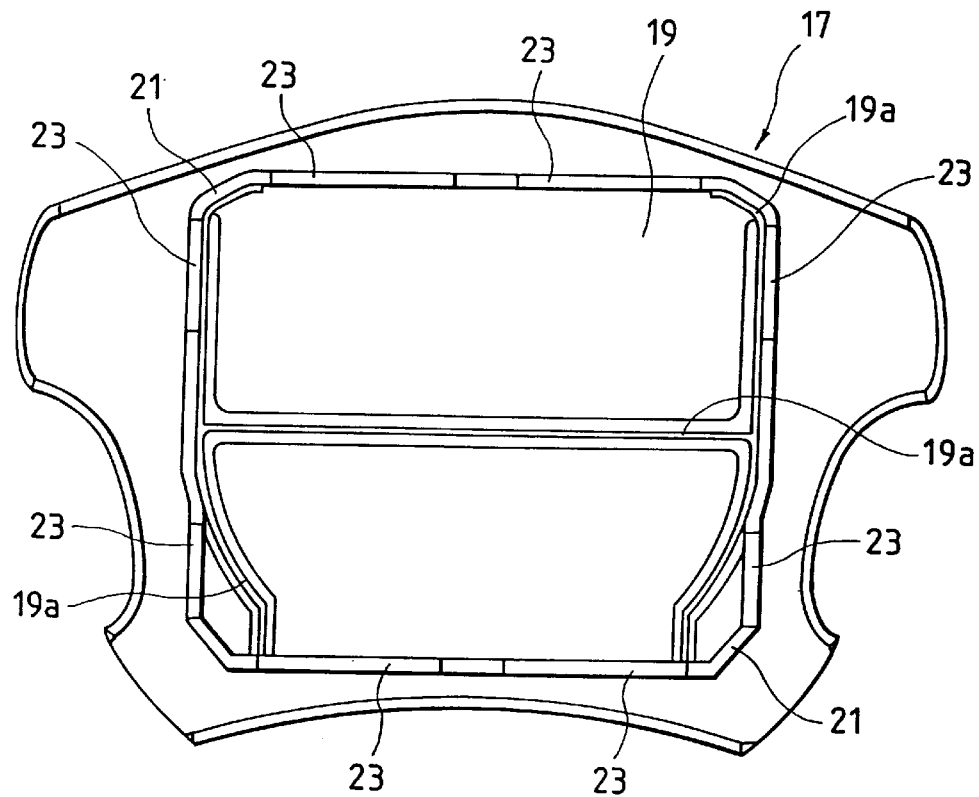
FIG. 4 is an enlarged bottom view of a pad the air bag assembly shown in FIG. 1.
Figure 5:
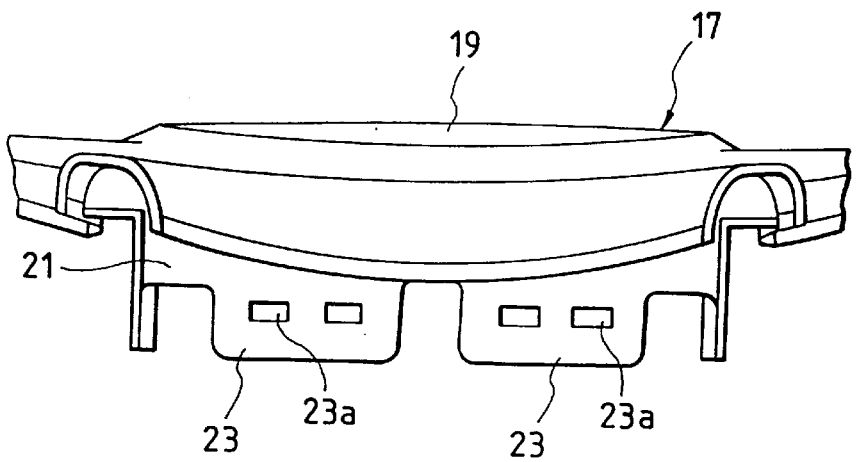
FIG. 5 is a front elevational view of the pad shown in FIG. 4.

Referring now more particularly to the drawings, there is shown in FIGS. 2 and 3 an air bag assembly, generally designated by reference numeral 10, according to an embodiment of the present invention.

Figure 1:
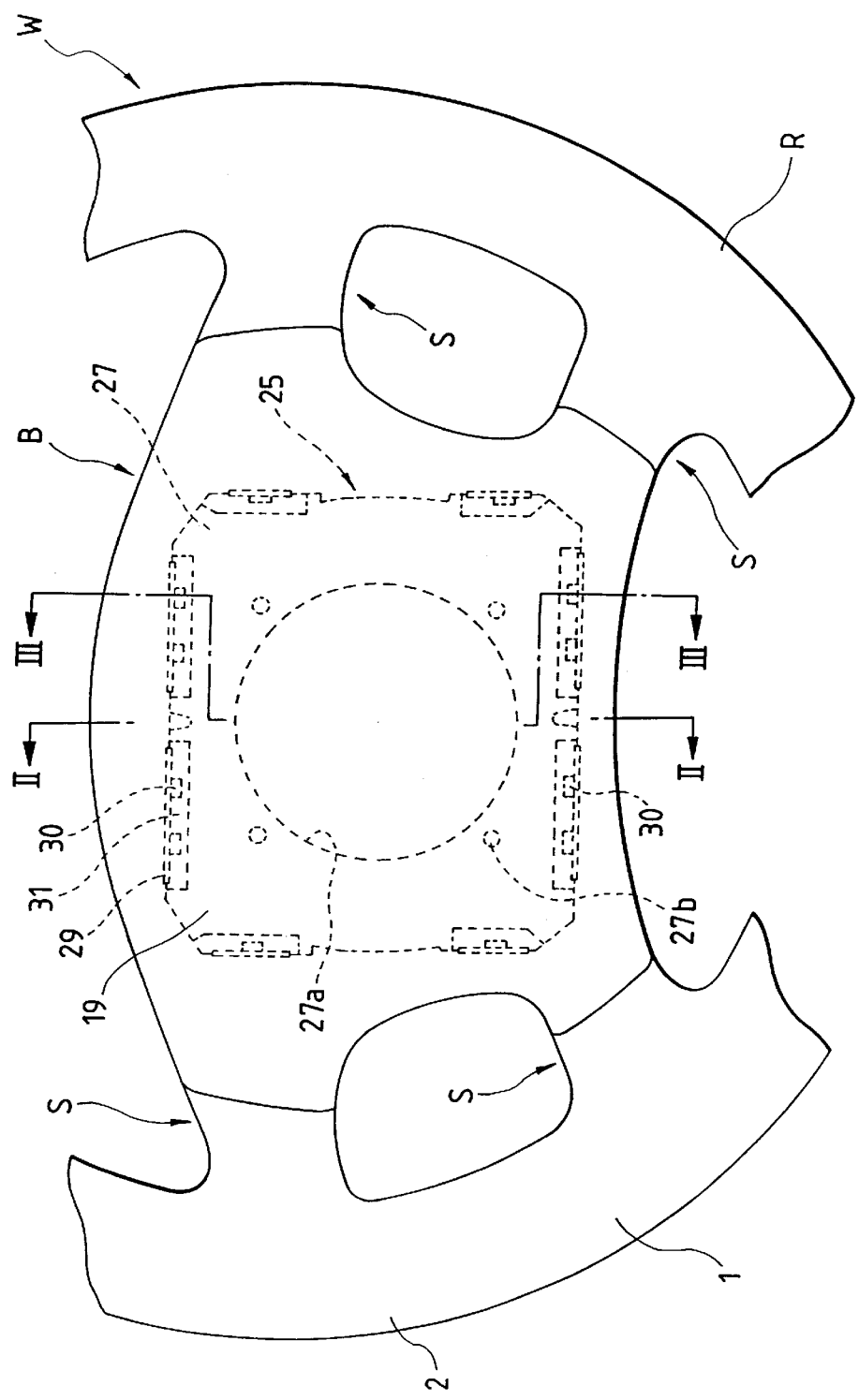
FIG. 1 is a top, partially phantomed view of a portion of a steering wheel assembly including an air bag assembly according to an embodiment of the present invention.

As shown in the FIG. 1, the air bag assembly 10 forms part of a steering wheel assembly W. The steering wheel assembly W also includes a steering wheel body 1, which comprises an annular ring portion R, a boss portion B provided in the center of the ring portion R, and four spoke portions S for connecting the ring portion R to the boss portion B. A core metal portion (not shown) is disposed in the boss portion B, the ring portion R, and the spoke portions S. A coating portion 2 covers the core metal portion in the ring portion R and regions of the spoke portions S in proximity to the ring portion R. A lower cover 3 (FIGS. 2 and 3) covers a lower surface of the boss portion B. The air bag assembly 10 is disposed on the boss portion B.

As shown in FIGS. 2 and 3, in an undeployed state the air bag assembly 10 comprises an air bag 11 in a folded position, an inflator 15 for supplying an inflating gas into the air bag 11, a pad 17 for covering the folded air bag 11, and a bag holder 25. The bag holder 25 serves to hold the air bag 11, the inflator 15, and the pad 17 and to fix the air bag assembly 10 to the steering wheel assembly W. In the illustrated embodiment, a pressure plate 27 for pressing the inside of a side wall structure 21 of the pad 17 is disposed below the bag holder 25.

Figure 6:
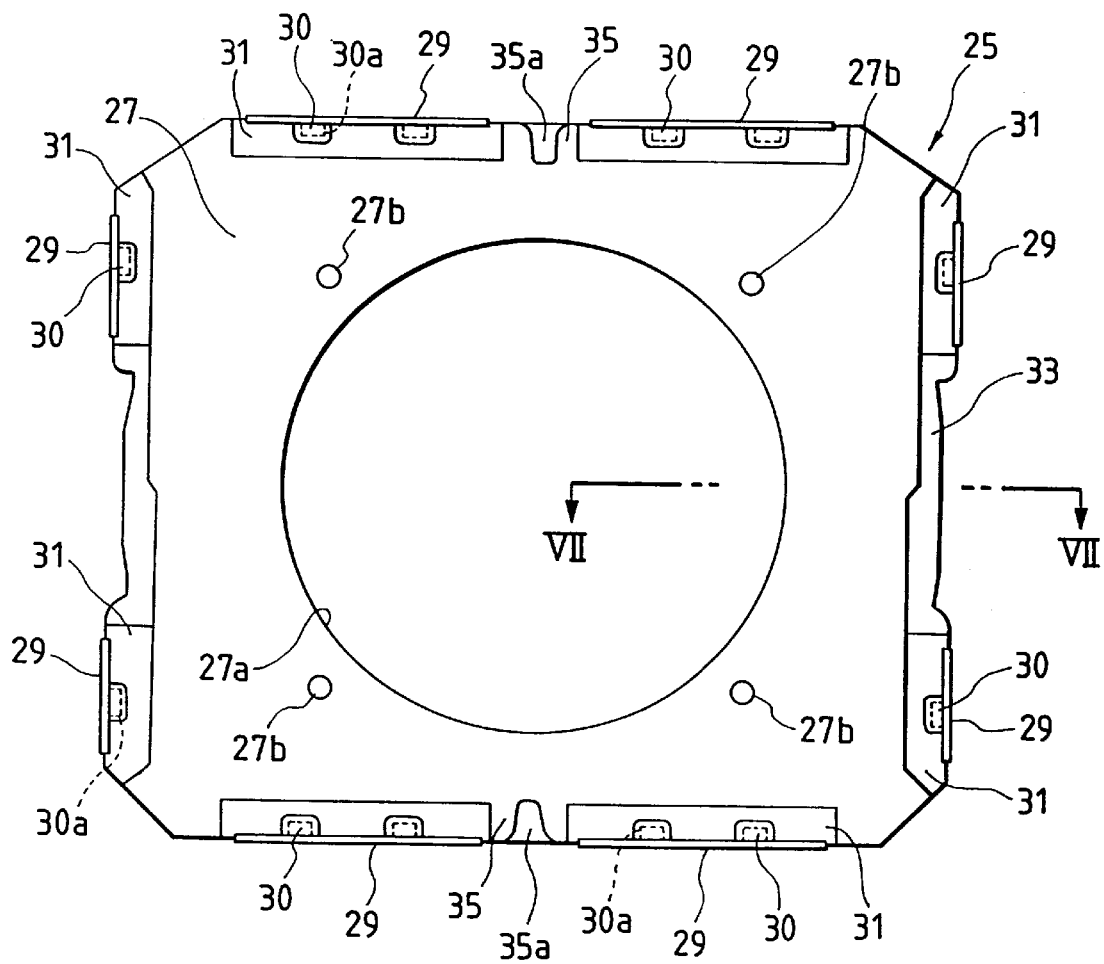
FIG. 6 is a plan view of a bag holder of the air bag assembly shown in FIG. 1.
Figure 8:
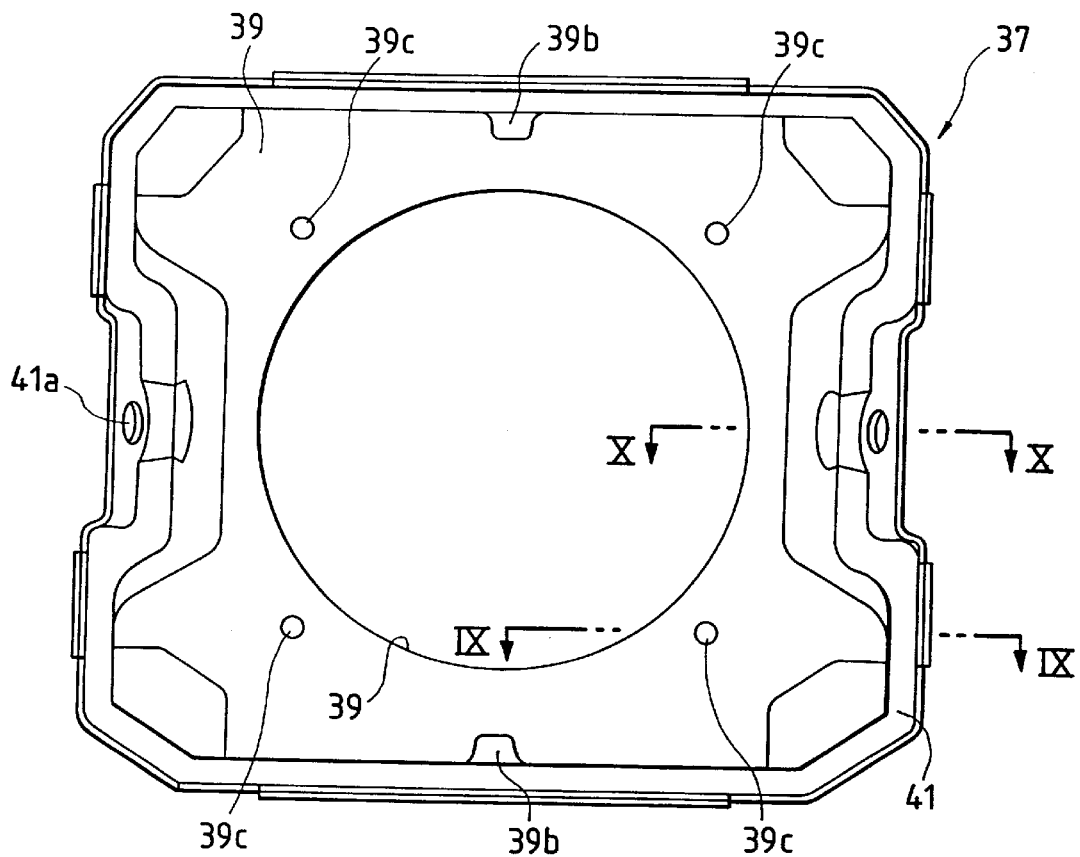
FIG. 8 is a plan view of a pressing plate of the air bag assembly shown in FIG. 1.
Figure 9:
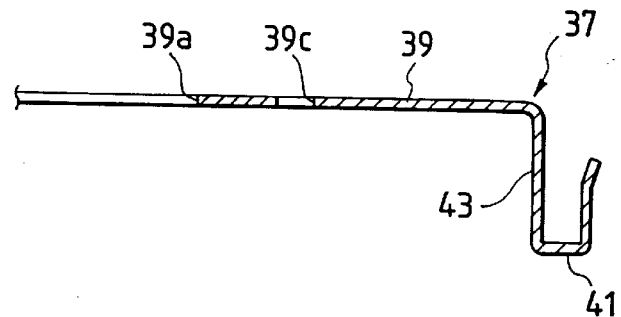
FIG. 9 is a sectional view taken along sectional line IX—IX of FIG. 8.
Figure 10:
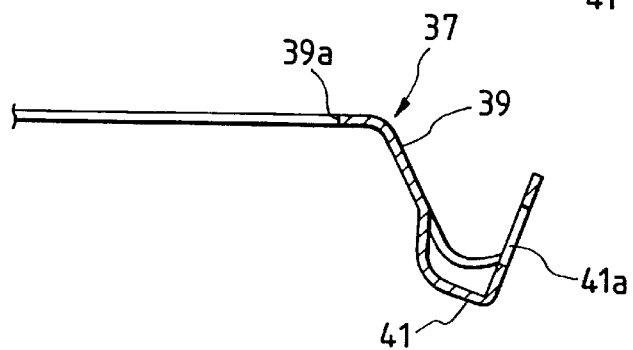
FIG. 10 is a sectional view taken along sectional line X—X of FIG. 8.
Figure 11:
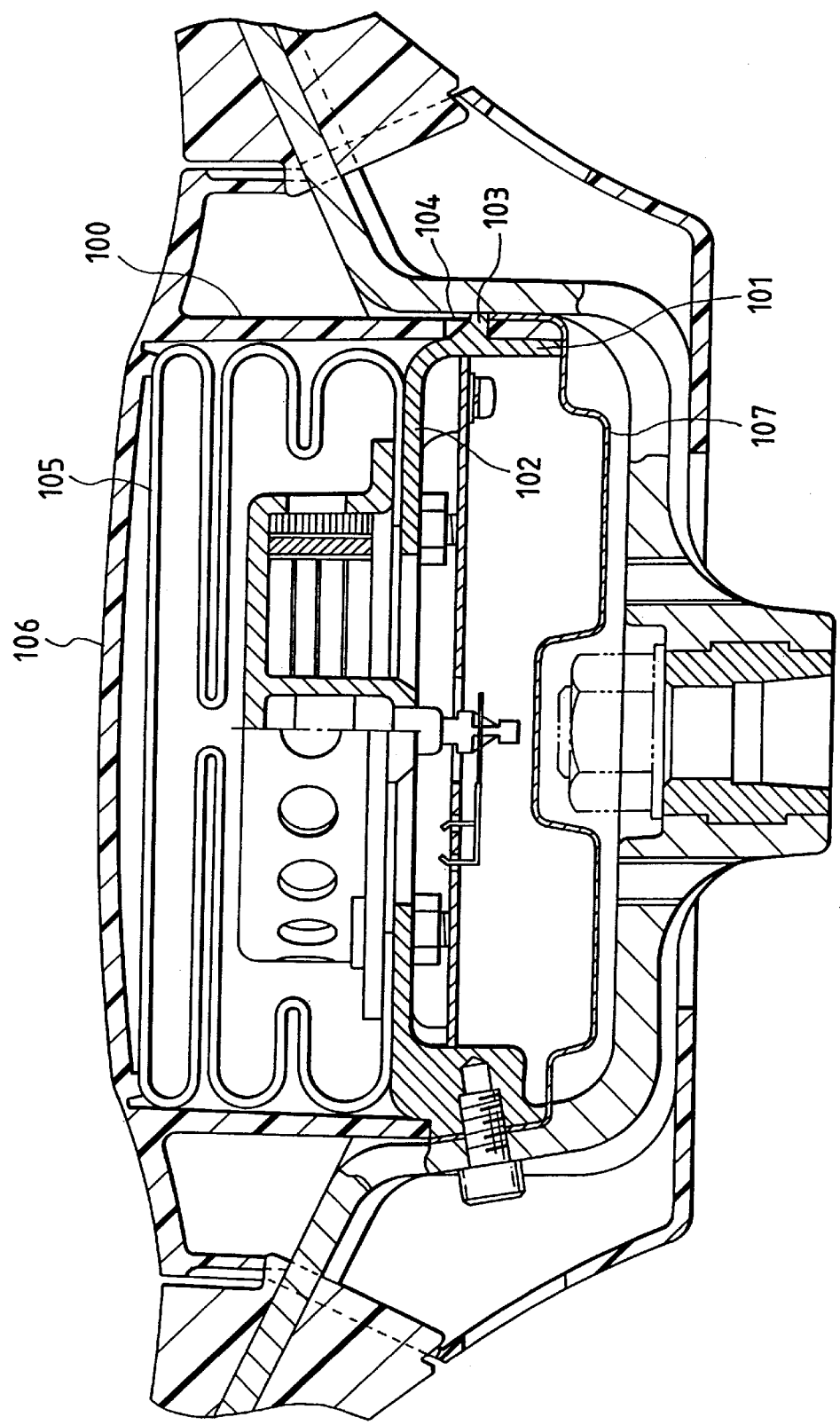
FIG. 11 is a sectional view of the conventional air bag assembly.

As further shown in FIGS. 2 and 3, the air bag 11 is expandable and is connected at an open end 11a to an annular retainer 13, which is disposed inside the air bag 11. A plurality of bolts (not shown), e.g., four bolts, are inserted into the circumferential edge portion (unnumbered) associated with the open end 11a and are fastened to the bag holder 25 and a pressing plate also referred to herein as a pressure plate 37 with nuts (not shown) so as to secure the air bag 11 to the bag holder 25. Referring to FIGS. 1, 6, and 8, the bolts pass through holes 27b of the bag holder 25 and holes 39c of the pressure plate 37 to achieve such securing engagement.

The inflator 15 is defined by a columnar body 15a having gas-outlets 15b disposed in an upper portion thereof and a flange portion 15c extending from the columnar body 15a and having through-holes (not shown) formed therein. The plurality of bolts and associated nuts securing the air bag 11 to the bag holder 25 can also be inserted through the through-holes of the flange portion 15c to secure the inflator 15 to the bag holder 25.

The pad 17 can be made of, for example, a synthetic resin. As shown in FIGS. 2 to 5, the pad 17 comprises a ceiling wall structure 19 and the side wall structure 21. The ceiling wall structure 19 covers and conceals from view the air bag 11 when in an undeployed state, while the side wall structure 21 extends in a downward direction from an outer peripheral portion of a lower surface of the ceiling wall structure 19 to define a tube having a substantially annular cross section.

The ceiling wall structure 19 has a rupturable portion 19a formed therein. The rupturable portion 19a is defined as a structurally weakened portion, such as a portion that is thinner than surrounding portions of the ceiling wall structure 19. When the air bag 11 is inflated from a folded to a deployed state via the inflator 15, the expanding air bag 11 applies force on the lower surface of the ceiling wall structure 19, fracturing the ceiling wall structure 19 along the rupturable portion 19a and creating a passageway that permits the air bag 11 to deploy into an interior compartment of the vehicle.

The side wall structure 21 of the pad 17 extends from an upper end (unnumbered) in contact with, and preferably integrally connected to, the lower surface of the ceiling wall structure 19 to a lower end (unnumbered) to defined a substantially oblong-like pipe. Lock plate portions 23 extend downward from the lower end of the side wall structure 21. Each of the two lock plate portions 23 shown in the illustrated embodiment has two lock holes 23a, which are formed in side-by-side relationship and have longitudinal axes oriented in a substantially horizontal manner.

The bag holder 25 can be made, for example, from a metallic material. As shown in FIGS. 1 to 3, 6, and 7, the bag holder 25 comprises a first, horizontal plate 27 and a second, vertical plate 29 extending downward from an outer circumferential edge portion of the horizontal plate 27. The horizontal plate 27 is configured to have an outer edge, at least a portion of which substantially corresponds in shape and dimension to an inner surface of the side wall structure 21 of the pad 17. As shown in FIG. 6, in the illustrated embodiment other portions of the outer edge of the horizontal plate 27 are recessed in a radially inward direction to permit fixing brackets 33 to be disposed at opposing sides of the horizontal plate 27. The construction and purpose of the fixing brackets 33 will be described in detail below.

The horizontal plate 27 has a plurality of spaced insertion holes 31 formed therein. The insertion holes 31 are shaped and arranged to receive corresponding ones of the lock plate portions 23. Referring to FIG. 6, the insertion holes 31 disposed at the top and bottom of the figure are positioned at opposite edges of the horizontal plate 27, with the insertion holes of each edge being interposed by connection portions 35 extending along the top and bottom edges of the horizontal plate 27. The connection portions 35 serve to connect the horizontal plate 27 and vertical plate 29 to each other, and include U-shaped ribs 35a centered along the length of the connection portions 35 for reinforcement. The U-shaped ribs 35a are formed by press-drawing the central portion of the connection portions 35. Referring again to FIG. 6, the insertion holes 31 disposed at the left and right of the figure are positioned at opposite edges of the horizontal plate, but are interposed by brackets 33.

Figure 7:
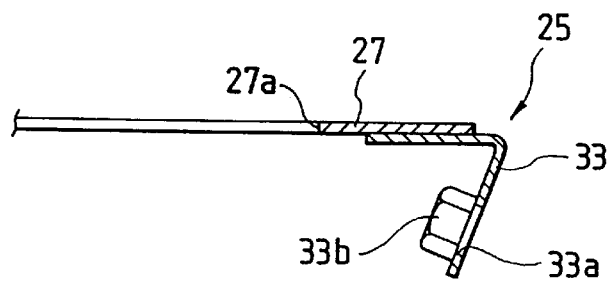
FIG. 7 is a sectional view taken along sectional line VII—VII of FIG. 6.

The center of the horizontal plate 27 has a through-hole 27a formed therein. The through-hole 27a is configured and positioned to permit at least a portion of the columnar body 15a of the inflator 15 to be inserted through the through-hole 27a from an underside of the bag holder 25. The fixing brackets 33, which in the illustrated embodiment are welded to the lower surface of the horizontal plate 27 at opposite edges of the horizontal plate 27, are provided to secure the air bag assembly 10 to the core metal portion of the steering wheel body 1. As shown in FIG. 7, each of the fixing brackets has a screw hole 33a defined by nuts 33b welded to predetermined positions of the fixing bracket 33. The air bag assembly 10 is designed to be fixed to a predetermined position of the steering wheel body 1 with, for example, bolts (not shown) which can be thread-engaged with the screw holes 33a.

As shown in FIGS. 1, 3, and 6, the vertical plate 29 of the bag holder 25 includes a plurality of locking claws 30 projecting radially inward from the vertical plate 29. The locking claws 30 are arranged at positions corresponding to the lock holes 23a of the lock plate portions 23 of the side wall structure 21 of the pad 17. Referring to FIGS. 3 and 6, each of the locking claws 30 has reinforcing ribs 30a provided on the left and right sides of the locking claws 30. The locking claws 30 are formed by the drawing process.

The pressure plate 37 can be made, for example, from a metal or similar material. As shown in FIGS. 2, 3, and 8 to 10, the pressure plate 37 has a base portion 39 with an outer edge (unnumbered), at least a portion of which substantially corresponds in shape and dimension to an inner surface of the side wall structure 21 of the pad 17. The pressure plate 37 also has substantially U-shaped side portions 41. When assembled, the side wall structure 21 of the pad 17 is pressed by an inner wall 43 of the pressure plate 37 to restrict the radial inward movement of the side wall structure 21 of the pad 17.

The center of the base portion 39 of the pressure plate 37 has a through-hole 39a formed therein. The through-hole 39a is configured and positioned to permit at least a portion of the columnar body 15a of the inflator 15 to be inserted through the through-hole 39a from an underside of the bag holder 25. U-shaped ribs 39b are formed on the pressure plate 37 to correspond to the positioning of the connection portions 35.

The substantially U-shaped side portions 41 of the pressure plate 37 are positioned to correspond to the fixing brackets 33, so that the fixing brackets 33 can be inserted into the side portions 41. Through-holes 41a are formed in the side portions 41 and positioned to align with screw holes 33a of the fixing brackets 33. Bolts (not shown) can be inserted in the aligned through-holes 41a and screw holes 33a to secure the pressure plate 37 to the bag holder 25.

Assemblage of the air bag assembly of the above-described embodiment will be described below.

The annular retainer 13 of the air bag 11 is initially disposed inside the air bag 11. Bolts (not shown) are positioned to engage holes (not shown) in the annular retainer 13 and extend out from the open end 11a of the air bag 11. The air bag is then folded.

Next, the lock plate portions 23 of the pad 17 are inserted into corresponding ones of the insertion holes 31 of the bag holder 25, and locking claws 30 are inserted into corresponding ones of the lock holes 23a of the lock plate portions 23. The pressure plate 37 is then disposed below the bag holder 25 so as to apply pressure against the inner surface of the side wall structure 21 of the pad 17. The columnar body 15a of the inflator 15 is inserted into the through-holes 39a and 27a of the bottom surface of the pressure plate 37 and the horizontal plate 27 of the bag holder 25, respectively, from below. The bolts are then inserted into the aligned through-holes 27b, 15b, and 39b of the horizontal plate 27, the flange portion 15c of the inflator 15, and the base portion 39 of the pressing plate 37, respectively. Nuts secure the bolts in place to complete the assemblage of the air bag assembly.

The air bag assembly 10 can then be mounted to the steering wheel body 1 by inserting bolts through the screw holes 33a of the fixing brackets 33 via the through-holes 41a of the pressure plate 37. The steering wheel body 1 can be connected to the steering wheel column (not shown) by conventional connecting means.

In operation, actuation of the air bag assembly by an appropriate sensor system (not shown) causes gas to discharge from the gas outlets 15b of the inflator 15 and inflate the air bag 11. As the air bag 11 expands, the air bag 11 imparts a force against the lower surface of the ceiling wall structure 19 of the pad 17 to rupture the ceiling wall structure 19 at the rupturable portion 19a. As the ceiling wall structure 19 is ruptured and spread apart by the expanding air bag 11, a passageway is created, thereby permitting the air bag 11 to deploy into an interior compartment of the vehicle. As the air bag 11 inflates, an outward pressing force and upward tensile force are transferred to the side wall structure 21 of the pad 17. Since the vertical plate 29 of the bag holder 25 is disposed in a radially outward position with respect to the side wall structure 21, the vertical plate 29 absorbs some of the outward pressing force and prevents disengagement of the side wall structure 19 from the bag holder 25. Further, since the locking claws 30 extend inward from the vertical plate 29, the likelihood of the locking claws 30 disengaging from the lock holes 23a of the side wall structure 19 is significantly reduced, if not eliminated. Thus, the engagement between the bag holder 25 and the pad 17 is enhanced without requiring the provision of a bag holder having a thickness that is greater than that of a conventional bag holder.

When the optional pressure plate 37 is used in the air bag assembly 10 of the present invention, the likelihood of disengagement of the side wall structure 21 of the pad 17 from the vertical plate 29 of the bag holder 25 can be further reduced in the following manner. During initial expansion of the air bag 11, the side wall structure 21 of the pad 17 tends to be forced in a radially outward direction. According to the present invention, the arrangement of the vertical plate 29 of the bag holder 25 and the locking claws 30 serve to restrict the initial outward movement of the side wall structure 21 of the pad 17 so as to reduce the chance of disengagement of the pad 17 from the bag holder 25. After this initial movement, the pad 17 tends to rebound back towards its initial position. The pressure plate 37 of the present invention serves to restrict the rebounding inward motion of the side wall structure 19 of the pad 17. Due to the construction and arrangement of the bag holder 25 and the locking claws 30, the rebounding force acting on the pressure plate 37 is much smaller than in a conventional assembly, so that the plate thickness of the pressure plate 37 can be selected to be thinner than a pressure plate of a conventional assembly. Accordingly, a reduction in weight of the air bag assembly 10 of the present invention can be attained even in the case where the pressure plate 37 is used.

As mentioned above, the air bag assembly 10 of the present invention can omit the pressing plate therefrom. In this case, an even greater reduction in weight of the assembly 10 can be obtained.

In its broadest aspects, several variations and modifications to the above-discussed assembly can be implemented without departing from the scope of the present invention. For example, although the above embodiment has been described in connection with a steering wheel assembly having four spokes, the present invention is equally applicable to assemblies having different numbers of spokes, such as three spokes. Further, the shape of the pad side wall structure is not limited as discussed above. For example, the shape of the pad side wall structure can have a polygonal, e.g., pentagonal, shape.

In the air bag assembly of the present invention, the vertical plate of the bag holder is situated radially outside of the side wall structure of the pad, such that the locking claws of the vertical plate project inward. As a result, the likelihood of disengagement of the locking claws from the lock holes of the side wall structure is significantly reduced, if not eliminated. Moreover, since the vertical plate of the bag holder confronts and absorbs the outward pressing force applied to the air bag when the air bag is inflated, the above-discussed rebounding force is substantially reduced. Hence, the pressure plate, which is required in a conventional assembly, can be eliminated from the assembly of the present invention. Consequently, the weight of the air bag assembly of the present invention can be reduced.

Further, when the pressure plate is employed in the present invention, the pressure plate can contribute in preventing the pad from disengaging the bag holder during inflation of the air bag by restricting the inward movement of the pad. Since the amount of rebounding force applied by the side wall structure of the pad is significantly reduced by the placement and arrangement of the vertical plate and locking claws of the bag holder, the pressing plate does not have to absorb as much stress as in a conventional assembly. Hence, the pressing plate of the present invention can be thinner than the conventional pressing plate.

Furthermore, in the bag holder, the connection portions are disposed so as to connect the horizontal and vertical plates to each other and to interpose insertion holes. The placement and configuration of the connection portions serves to prevent the vertical plate of the bag holder from deforming toward the outside in the vicinity of the insertion holes of the bag holder during inflation of the air bag. Stated differently, without the connection portions, the vertical plate of the bag holder is easily deformed outward during inflation of the air bag. As a result of this deformation, the lock claws are more easily disengaged from the lock holes, so that the pad is more liable to disengage from the bag holder. Thus, the connection portions serve to prevent the lock claws from disengaging from the lock holes during inflation of the air bag.

An air bag assembly is disclosed in the priority application, which was filed in Japan as Application No. Hei. 8-196515 on Jul. 25, 1996, the complete disclosure of which is hereby incorporated by reference into the present specification.

It will thus be seen that the objectives and principles of this invention have been fully and effectively accomplished. It will be realized, however, that the foregoing preferred specific embodiments have been shown and described for the purpose of this invention and are subject to change without departure from such principles.

What is claimed is:

1. An air bag assembly constructed to be mounted in an automobile vehicle, said assembly comprising:

an air bag expandable between a folded state and a deployed state;

a pad having a ceiling wall structure and a side wall structure, said ceiling wall structure configured to cover and conceal from view said air bag when in the folded state and constructed and arranged to rupture when said air bag expands from the folded state to the deployed state to create a passageway which permits said air bag to deploy into an interior compartment of the vehicle, said side wall structure extending from said ceiling wall structure to define a substantially annular cross section and including a plurality of spaced lock holes formed therein;

a bag holder structure interconnected to said air bag and said pad, said bag holder structure comprising first and second plates, said first plate having a plurality of spaced insertion holes formed therein which are configured to receive portions of said side wall structure of said pad, at least a portion of said second plate being disposed in a radially outward position with respect to said side wall structure of said pad;

said portion of said second plate including a plurality of locking claws, which are disposed to extend radially inward and engage corresponding ones of said lock holes of said pad to thereby secure said pad to said bag holder structure; and at least one connection portion interposed between two of said insertion holes of said bag holder structure, said connection portion connecting said first plate to said second plate.

2. An air bag assembly according to claim 1, wherein said first plate and said second plate are substantially horizontally oriented and vertically oriented, respectively, when said air bag assembly is mounted in the vehicle.

3. An air bag assembly according to claim 1, further comprising a pressing plate disposed at a radially inward position with respect to an inner surface of said side wall structure of said pad so as to restrict inner movement of said side wall structure during and immediately after expansion of said air bag from the folded state to the deployed state.

* * * * *